United States Patent
Levy et al.

(10) Patent No.: US 8,589,336 B1
(45) Date of Patent: Nov. 19, 2013

(54) FRAMEWORK FOR AUTOMATED STORAGE PROCESSES AND FLEXIBLE WORKFLOW

(75) Inventors: Assaf Levy, Tel Aviv (IL); Roy Alon, Tel Aviv (IL); Michael Yakobi, Tel Aviv (IL); Ofer Nivy, Tel Aviv (IL); Vered Rosen, Tel Aviv (IL)

(73) Assignee: Netapp, Inc., Sunnyvale, CA (US)

( * ) Notice: Subject to any disclaimer, the term of this patent is extended or adjusted under 35 U.S.C. 154(b) by 224 days.

(21) Appl. No.: 13/093,656

(22) Filed: Apr. 25, 2011

(51) Int. Cl.
   *G06F 17/30* (2006.01)

(52) U.S. Cl.
   USPC ............................................. 707/602

(58) Field of Classification Search
   USPC ............................................. 707/602
   See application file for complete search history.

(56) References Cited

U.S. PATENT DOCUMENTS

2007/0112875 A1 * 5/2007 Yagawa .................... 707/200

* cited by examiner

*Primary Examiner* — Huawen Peng
(74) *Attorney, Agent, or Firm* — Perkins Coie LLP

(57) ABSTRACT

Methods and systems for providing a framework for automated storage processes and flexible workflow are disclosed. The framework provides a user workflow design tool to create and/or customize workflow automation processes without needing to write software code. Additionally, the workflow design tool provides a mechanism that allows the workflow to make decisions, such as selecting storage resources.

31 Claims, 11 Drawing Sheets

| Designer | Host Virtualization (3) | | [-] |
|---|---|---|---|
| Execution | Add Virtualization building block | Edit | Submit |
| >Portal | Migrate VM storage | Edit | Submit |
| > Workflow Execution | Provision Gold VM storage | Edit | Submit |
| > Jobs | | | |
| > General Log | Oracle (5) | | [-] |
| > Execution Log | Migrate production Oracle storage | Edit | Submit |
| > Finders Log | Oracle RAC/No RAC Provisioning | Edit | Submit |
| > Commands Log | Production Orade FC provisioning | Edit | Submit |
| > Client Log | QA Oracle NFS provisioning | Edit | Submit |
| | Remove QA Oracle storage | Edit | Submit |
| | | | |
| | Secure Multi-Tenant (SMT) (3) | | [-] |
| | Provision a new Secure Tenant | Edit | Submit |
| | Provision storage for a new Tenant | Edit | Submit |
| | Remove a secure Tenant | Edit | Submit |
| | | | |
| | Transitioning (2) | | [-] |
| | Transition Dev storage from 7-mode to 8-... | Edit | Submit |
| Setup | Transition production storage from 7-mod... | Edit | Submit |

*FIG. 3*

| Node: | Define |
|---|---|
| Variable: | data_vol |
| Type: | Volume |
| Policy: | None |

| Attribute | Value |
|---|---|
| aggregate | data_vol_aggr |
| array | data_vol_aggr.array |
| autodelete | 'state on, commitment try,delete_order oldest_first' |
| autosize_grow_pct | |
| autosize_max | |
| available_size_mb | |
| dedupe | |
| max_capacity_mb | pad12AndConcat("n_data_",$SID,"_0") |
| name | |
| options | 'nosnap on,create_ucode on,try_first snap_delete' |
| size_mb | data_vol_size |
| snap_reserve_percent | 50 |
| snap_sched_options | '0 7' |
| space_reserved | none |
| state | |
| type | |

FIG. 4B

US 8,589,336 B1

FRAMEWORK FOR AUTOMATED STORAGE PROCESSES AND FLEXIBLE WORKFLOW

FIELD OF THE INVENTION

At least one embodiment of the present invention pertains to network storage systems, and more particularly, to a workflow design tool for automating storage processes.

BACKGROUND

Certain storage management operations can be complex and time-consuming processes. For example, end-to-end storage provisioning is typically a multi-step process that allocates storage capacity to a storage server by assigning space on physical storage devices to meet the user's need for storage capacity and requirements for performance, security, and efficiency. Storage provisioning involves steps such as the assignment of servers to appropriate storage media, specifying paths between the servers and storage devices, and zoning the network to ensure access by the appropriate servers.

Traditionally, software-based storage management tools have been used to carry out a specific sequence of operations for performing storage-related processes, such as provisioning. However, existing storage management tools are not easily customizable by a user to enable additional operations not already provided or to change a storage operation's workflow to suit specific needs of the user. While the operations carried out by some existing tools may be customized to meet a user's needs, the customization involves reading of program code to interpret the pre-established workflow sequence and manually modifying the code.

Further, existing storage management tools only automate storage-centric commands specific to a particular vendor's storage products. However, even common storage-centric workflows include commands associated with non-storage elements, such as servers, applications, virtualization layers, network elements, and internal information technology systems. Thus, existing storage management tools are not able to automate the entire end-to-end storage management process.

BRIEF DESCRIPTION OF THE DRAWINGS

Examples of a method and system for generating a workflow design tool for automating storage processes are illustrated in the figures. The examples and figures are illustrative rather than limiting.

FIG. 3 shows examples of a display screen of a user interface, indicating end-to-end storage processes that can be automated using the workflow design tool.

FIG. 4B shows an example of an editable window for defining a storage object.

DETAILED DESCRIPTION

Described in detail below is a framework that can be used as a design tool to customize and automate workflows. In particular, a storage architect can use the framework to customize and automate end-to-end storage management processes. The tool in one embodiment uses a table-based workflow layout that provides an intuitive way for a user (e.g., a storage administrator or architect) to create, modify, and visualize the various steps involved in a complex storage management process. The user selects each storage command to be performed and determines an order in which the commands are to be performed in the workflow. The framework displays the commands sequentially in the first row of a workflow table, from left to right. The contents of the cells in the table correspond to storage objects upon which the respective storage command associated with the cell's column operates. Each storage object can be defined and has associated parameters that can be configured by the user. Each storage command also has configurable parameters. With the table layout, each row of the table represents an easily visualized storage-related workflow that is based on the commands associated with the columns of the table.

Network Environment

Figure 1:
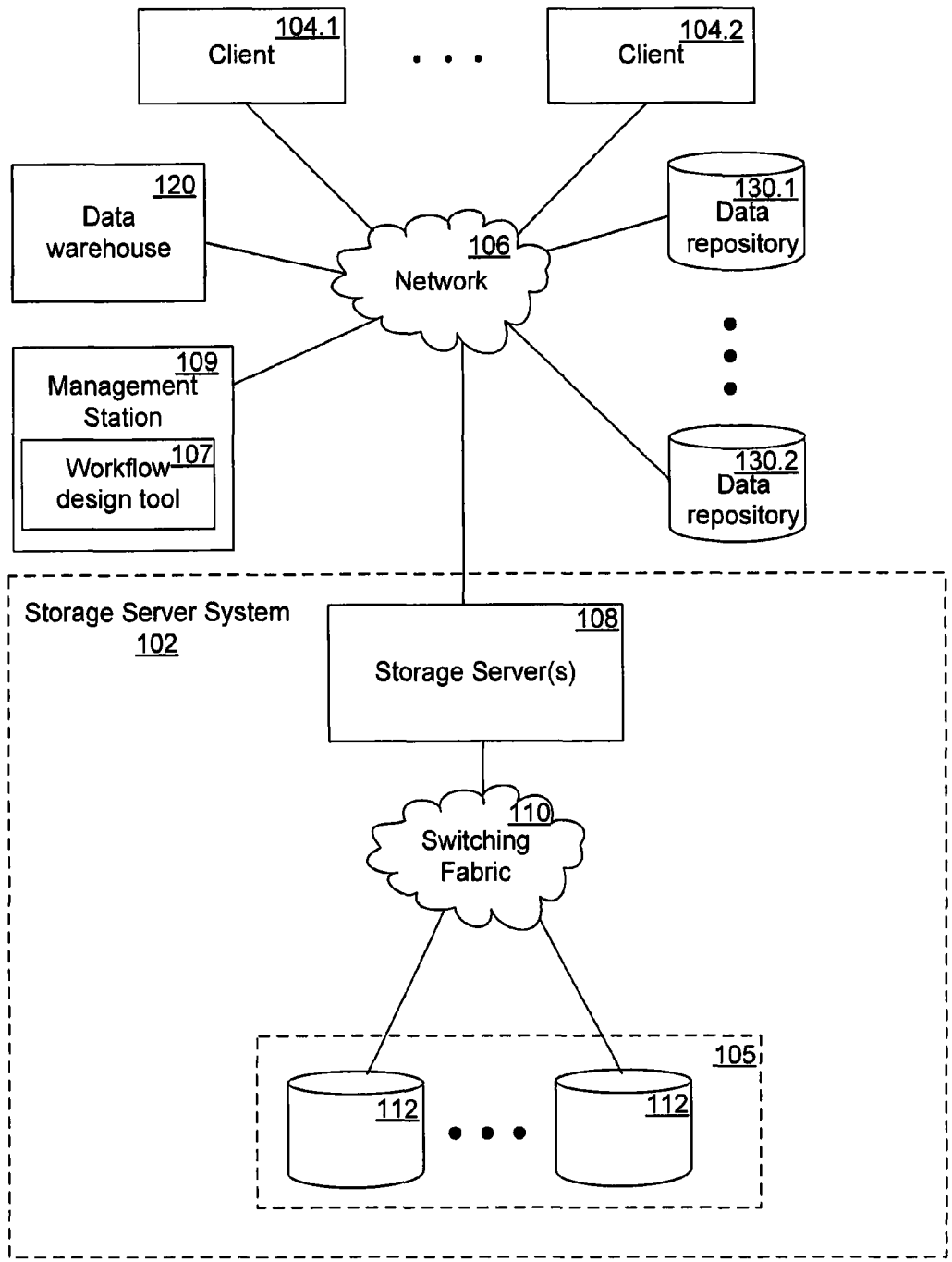
FIG. 1 illustrates a network storage environment in which the present invention can be implemented.
Figure 2:
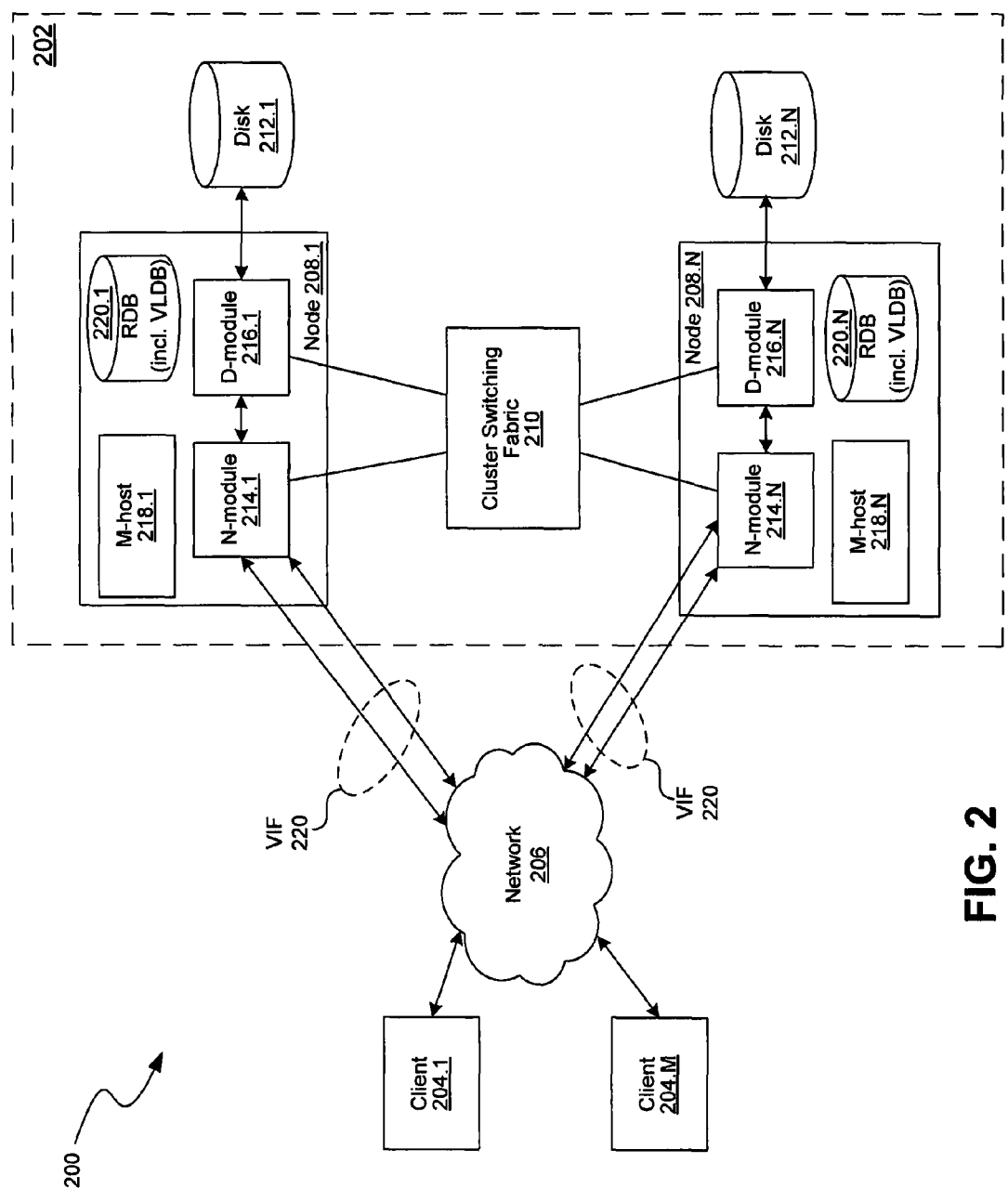
FIG. 2 illustrates a clustered network storage environment in which the present invention can be implemented.

FIGS. 1 and 2 show, at different levels of detail, a network storage environment in which the techniques introduced here can be implemented. It is noted that the clustered environment of FIG. 2 is for illustration of one type of a configuration in which the techniques can be implemented, and that other network storage configurations, including non-clustered configurations, can be used for implementing the techniques.

FIG. 1 shows a network data storage environment that includes a plurality of client systems 104.1-104.2, a storage server system 102, and computer network 106 connecting the client systems 104.1-104.2 and the storage server system 102. The storage server system 102 includes at least one storage server 108, a switching fabric 110, and a number of mass storage devices 112, such as disks, in a mass storage subsystem 105. Alternatively, some or all of the mass storage devices 112 can be other types of storage, such as flash memory, solid-state drives (SSDs), tape storage, etc.

The storage server (or servers) 108 may be, for example, one of the FAS-xxx family of storage server products available from NetApp, Inc. of Sunnyvale, Calif. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, Fibre channel, or iSCSI, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored data objects. A "data object," as indicated herein, refers to a logical container of data (e.g., volume, logical unit (LUN), directory, file). Note that a "file system" does not have to include or be based on "files" per se as its units of data storage.

Various functions and configuration settings of the storage server 108 and the mass storage subsystem 105 can be controlled from a management station 109 coupled to the network 106. Among many other operations, deployment, provisioning, scheduling backups and snapshots, and management of storage can be initiated from the management station 109. The management station 109 includes a workflow design tool 107, shown in more detail in FIG. 9, that performs various functions to generate a visual representation of a framework for a workflow of storage management related commands. In one embodiment, the storage management related commands are to be performed on the storage server system 102. In one embodiment, the storage management related commands are to be performed on virtualization systems and/or server systems.

FIG. 2 depicts a clustered network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc.

Each of the nodes 208 is configured to include several modules, including an N-module 214, a D-module 216, and an M-host 218 (each of which may be implemented by using a separate software module) and an instance of, for example, a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

The above description provides a general illustration of a storage server system on which the techniques described herein can be implemented. The following sections provide a description of methods and systems by which a graphical workflow layout can be generated to perform custom storage-related operations on a network storage system, a virtualization system, and or a server system.

End-to-End Storage Process Workflows

FIG. 3 shows an example of a user interface display screen indicating examples of complex end-to-end storage workflows that have been automated using the workflow design tool, for example, provisioning or removing of databases, provisioning or removing of secure tenants, and provisioning or migrating virtual machine storage. The display screen in FIG. 3 shows available workflows that have previously been built and are intended to be accessed by either an architect who designs and edits the workflows or an operator who executes the workflows. There are two buttons to the right of each workflow listed in the display screen, edit and submit. A storage architect would select the edit button to edit and/or customize a storage workflow, while an operator would select the submit button to execute the corresponding workflow.

Workflow Layout

As described further below, the design tool can be used to automate an end-to-end storage centric process and presents an intuitive layout of workflow information for defining and editing storage management processes, where intuitive means that the layout is easy to use and understand. In one embodiment, the layout is in the form of a data structure, such as a two-dimensional data structure array or a table. A table-based format makes the complex interactions of the steps of a workflow straight-forward to understand. The table can be made up of sub-tables of commands that have a small number of columns, for example, two to three columns, where the sub-tables are building blocks of a workflow. Each building block (sub-table) is a representation of a pre-defined program code for a command that includes a number of adjustable command parameters. The architect of the workflow can adjust parameter values to suit a particular workflow, rather than writing program code for any of the building blocks or the workflow itself. The architect simply selects or defines the appropriate building blocks, specifies the command parameters for the building blocks, and designates their relative order in the table to create a workflow. Further, the architect enters data for the variables for the corresponding workflow command in the cells of the table. The values of each cell and the parameters associated with each cell are made available to all cells that are both a) to the right of that cell and b) are either at the same row or at a lower row. Thus, the table format provides for a logical encapsulation of the relationships between objects associated with the cells of the table. When the workflow executes, the commands in the table are performed sequentially from left to right, one building block at a time, and the workflows of each row are executed from the top of the table to the bottom. The table format of the workflow helps the architect to visualize the interconnected steps of the workflow.

Figure 4A:
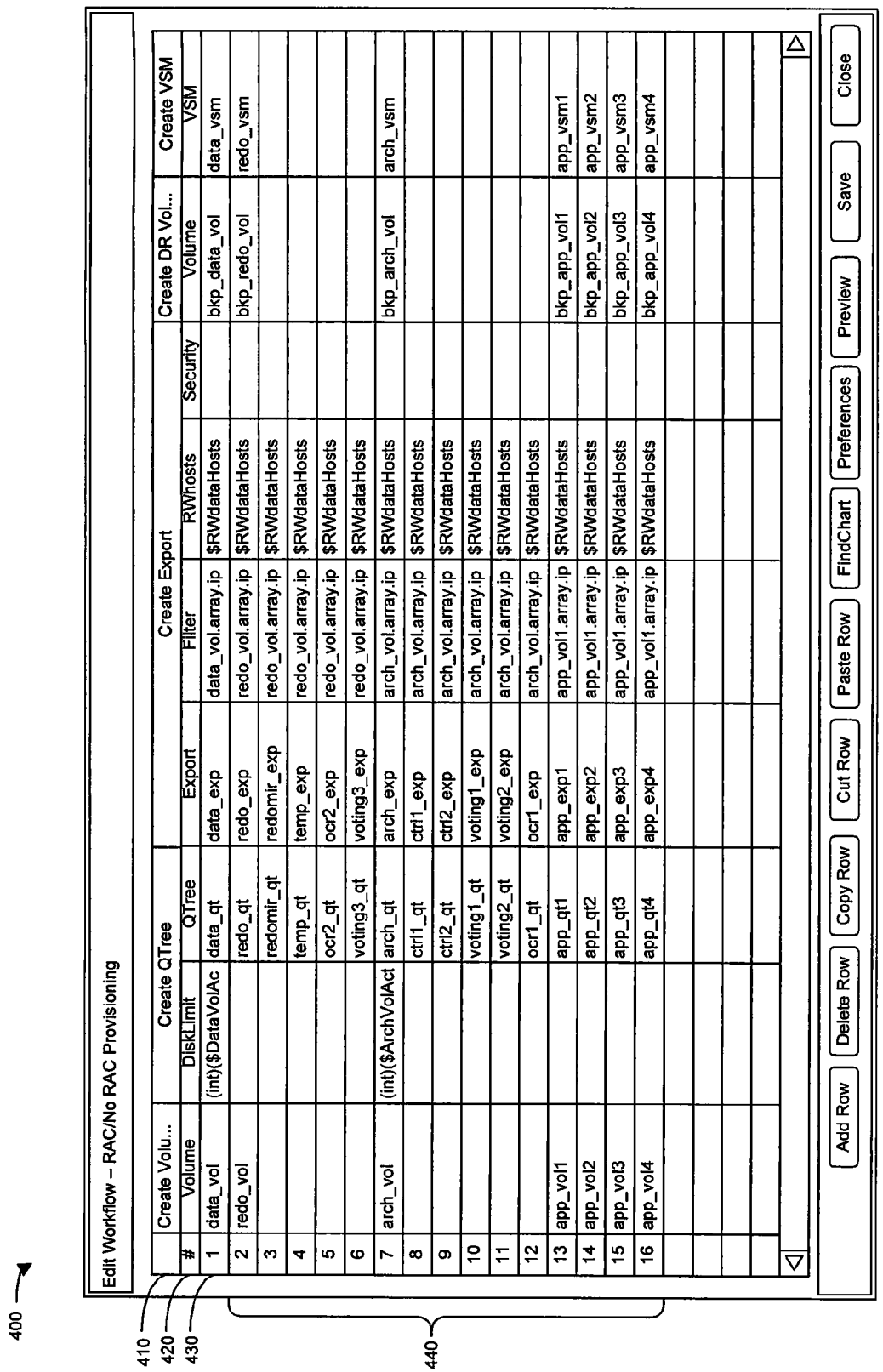
FIG. 4A shows an example of a workflow layout in a table format.

FIG. 4A shows an example of a workflow layout in a table format that is configured for provisioning storage for a database, such as an Oracle database. There are four interconnected layers within the design tool construct that an architect accesses to build a workflow similar to the example displayed in FIG. 4. The four layers include 1) selecting workflow commands, 2) entering data, for example storage objects or values, for variables of the selected workflow commands, 3) entering parameters for each variable, and 4) adding filters and finders for making decisions with respect to the parameters and variables. Not all four layers are necessarily accessed for each workflow variable. The architect drills down into the four layers of the construct in designing a workflow as needed.

In the first layer of the design tool construct, the architect selects commands that make up the workflow. In one embodiment, the architect selects commands from a list of pre-defined commands and arranges the commands in an appropriate sequential order for the workflow. Once the commands have been sequentially ordered by the architect, the commands are displayed from left to right in a workflow table, with the names of the selected commands shown at the top of each column. In the example of FIG. 4, the first row 410 of table 400 lists the series of selected storage commands, i.e., building blocks, that are to be executed to perform the provisioning of storage for the database.

The first column heading in table 400 shown in row 410 is an abbreviated form for the command "Create Volume". The command "Create Volume", when executed, selects a storage area on a storage array, such as in an aggregate of physical storage. Continuing along row 410, the next column heading in table 400 is the command "Create Qtree" which creates a qtree, also known as a quota tree. A qtree is a top-level directory within a volume which has special properties for managing quotas to limit disk or other media storage usage and file usage and also for managing access permissions. The next column heading in row 410 is the command "Create Export" which makes the storage available to a host by exporting the file system paths on the storage system and making them available for mounting by, for example, NFS clients.

The remaining two column headings in row 410 are the commands "Create DR Volume" and "Create VSM". These commands relate to creating secondary volumes that can be used for disaster recovery (DR) or replication of data. The command "Create DR Volume" selects a storage area on a storage array to be used for disaster recovery, and the command "Create VSM" creates a destination volume on a destination file server that has the same size or greater size as the source volume that is being protected. A utility is used for replicating the data on the source storage at the destination volume.

The second row 420 of table 400 contains pre-defined headings that describe the types of values for the variables associated with each command to be inserted in the cells in the respective columns. In the second layer of the design tool construct, the architect enters the data for the variables for each of the selected commands. In one embodiment, the architect can enter a value for the variable in the cell and click on the cell to select the cell for further editing. For example, clicking on the cell in row 430 of table 400 that has the value "data_vol" brings up an editable window shown, for example, in FIG. 4B. The variable is shown to have the name 450 "data_vol" because it was either entered in table 400 or entered in this window by the architect. The variable is a storage object that has been selected to have a type 452 "volume". In the example of FIG. 4B, no policy 454 is selected, however a policy can be selected that describes how the data in the volume is to be managed.

In the third layer of the design tool construct, the architect enters parameter values for each variable attribute. The attribute table 456 for a volume variable is shown in FIG. 4B. Each of the attributes in the table 456 is used to define the "data_vol" variable. The values for the attributes can be entered by the architect. In some instances, the architect can select a predefined function to be used for an attribute value. A function works like a macro to perform small repetitive tasks, for example, an addition function or a subtraction function. In some instances, the values can be specified at run-time by the operator when the workflow is executed, for example, an identification number.

Each of the selected workflow commands can have a large number of variables that can be adjusted. For example, the command "Create QTree" has two variables "DiskLimit" and Qtree" shown in the row labeled "#" in table 400 directly below the command name. The variable names are descriptive pre-defined names that aid the architect in supplying the correct information to the workflow framework. In order to make the workflow table more compact, not every variable is necessarily displayed in FIG. 4A. The architect can specify preferences for how many variables are shown for each command displayed in the table. The architect can display a variable for editing and subsequently hide the column from view, for example, if it does not impact the overall understanding of the workflow.

The heading "DiskLimit" denotes that the contents of the cells in that column are values that specify a limit to the disk space or other media storage space available to the qtree that is created, and the heading "Qtree" denotes that the contents of the cells in that column are names of the qtree storage object to be created. Thus, the contents of the cell in row 430 below "DiskLimit" specifies the value for the limit to the disk or other media storage space (the quota) for the qtree called "data_qt" that is specified in the cell in row 430 directly below "Qtree".

Continuing in the second row 420 of table 400, below the storage command "Create Export", there are four headings, "Export", "Filer", "RWhosts", and "Security". The heading "Export" denotes that the contents of the cells in that column are names of file system volumes to be exported. The heading "Filer" indicates that the contents of the cells in that column are names of file system paths that are available for mounting by NFS clients. The heading "RWhosts" indicates the contents of the cells in that column are read-write hosts. The heading "Security" indicates that the contents of the cells in that column are types of security styles for the exported file system paths.

There are two remaining headings shown in the last two columns of row 420 of table 400, "Volume" below "Create DR Volume" and "VSM" below "Create VSM". Similar to the storage command "Create Volume", "Volume" denotes that the contents of the cells in that column are names of volumes to be created for disaster recovery, while "VSM" indicates that the contents of the cells in that column are names of destination volumes to be created for replication of source volumes.

The workflow is a series of storage commands to be performed. The ordering of the storage commands in the table layout, from left to right, specifies the order in which the storage commands are to be performed. Further, the rows in a workflow table are executed sequentially from top to bottom. Thus, row 430 is a workflow, and each of the rows 440 in table 400 are also workflows that execute the same commands as row 430 but with different input variable values. Typically, the commands are executed sequentially from left to right, and the workflows are executed from the top of the table to the bottom. However, in some embodiments, the command order and workflow execution order can be defined to be in a different order. Further, some embodiments can provide a layout different from a table, with its own corresponding arrangement of command order.

Further, execution of the workflow table from left to right and top to bottom readily provides for automatic referencing of implicit dependencies between storage objects in the table. For example, in row 430, the qtree "data_qt" should be created inside a volume. No volume is explicitly provided to the "Create QTree" command, however, the "Create QTree" command searches for the first variable having the type "volume" that is to the left of the "data_qt" cell in the same row or in a row above that cell. For example, for the qtree "data_qt", the volume in which it will be created is specified in the same row 430, "data_vol", while for the qtree "redomir_qt" in row #3 in table 400, the volume in which it will be created is specified in the row above, row #2, "redo_vol". Thus, the workflow table supports implicit dependencies between cells based upon relative locations of the cells in the table, such that if a command to be performed on a storage object in a particular cell needs a parameter of a particular type that has not been explicitly provided by the storage architect, parameters having the same type that have been defined in cells that are to the left of or to the left and above the particular cell in the workflow table are available to be automatically and implicitly referenced by the particular cell.

Additionally, the user can edit the workflow using the table format. For example, the user can select two storage commands and their respective columns in a workflow table. After selecting those two storage commands, a user can actuate a mouse or other human interface device to move those columns to another location in the table. In other embodiments, left or right controls can be used to change the order of the columns in the table. The interface can further be configured to permit a user to select one or more columns and remove a command from the workflow altogether. In a similar manner, the user can select one or more rows of the workflow table to remove the rows from the table, add rows to the table, and move rows to other positions in the table to change the order in which the workflows are executed.

In one embodiment, the architect can define a new command and add it to the workflow layout. A new command can be defined by specifying a list of parameters for the command, and each parameter can be associated with a name and an object type. Then the parameters are linked to computer code that provides instructions for performing the task. The architect can upload code written in Perl, Java, Microsoft Powershell or other scripting languages Resource Selection The design tool described above can also allow the workflow to include a construct for making decisions, such as selecting appropriate storage resources, without requiring the architect to write computer code. In the fourth layer of the design tool construct, the architect defines filters to be used by the workflow. A combination of filters creates a construct called a finder that is used by the workflow to make a resource selection decision.

The architect uses the filters as logic building blocks that specify the criteria to be used in making a decision without having to write computer code to do so. Filters can be easily added or removed from a finder. In one embodiment, filter criteria or parameters can be presented to the user in a drag and drop format for ease in defining a finder search algorithm. One or more filters are used to define a finder. Each filter can have no parameters, one parameter, or multiple parameters, and a finder's parameters are the parameters of all of the filters that make up the finder.

The workflow design tool construct can be used for automating any type of process, and finders can be constructed to perform a general search, not just for storage resources. As an example, a finder can be defined for finding a particular street in a database using two filters. A first filter can search for streets in the database that are in a particular town in the United States. The architect can specify that parameters to be used with the first filter are the name of the town and the state in which the town is located. A second filter can then be defined to search for a particular street in the town found by the first filter, and the architect specifies the parameters to be used with the second filter are the name of the street and the number of buildings located on the street. The parameters used for the first and second filters should be data that is available in an accessible database. Thus, a finder can be designed by the architect to select a particular street in the United States, even though there is no predefined algorithm available.

In the example of FIG. 4A, each volume storage object that is specified under the command "Create Volume" is defined by the architect in the second layer of the design tool construct, as described above and shown in FIG. 4B. In the case of a volume storage object, the volume should be created in an appropriate aggregate, where an aggregate is a logical aggregation of physical storage. Thus, in an automated storage process that creates a volume, the workflow should be able to independently find an appropriate aggregate in which to create the volume. In one embodiment, the workflow uses a finder to identify an aggregate. Thus, some storage objects, such as a volume, have a finder associated with them that should be defined before executing the workflow.

Figure 4C:
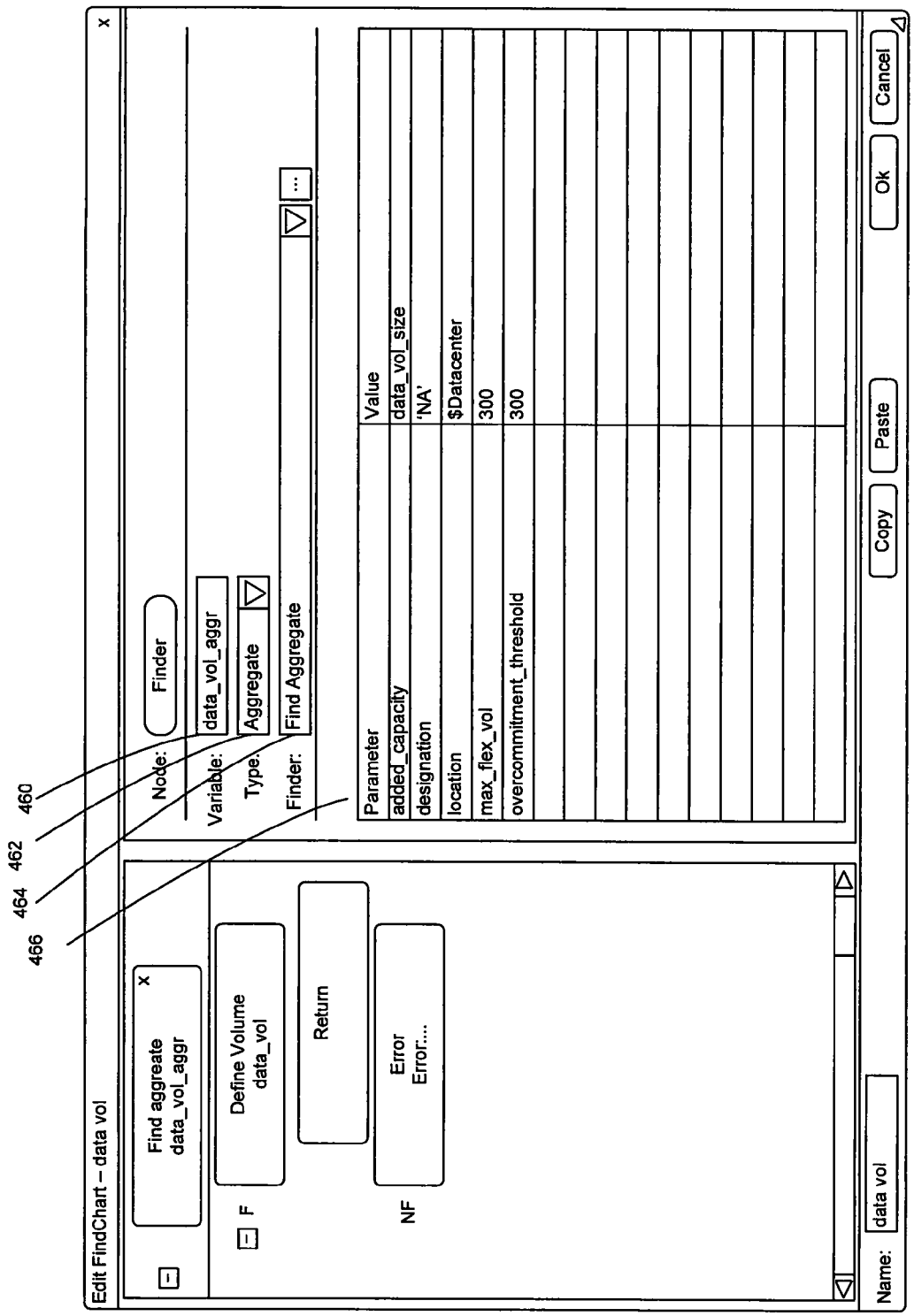
FIG. 4C shows an example of an editable window for defining a finder to search for a storage resource.

In the example of FIG. 4C, an editable window for defining a finder used by the workflow to find an aggregate in which to create a volume is shown. Similar to defining a storage object, the finder variable is given a name 460 (data_vol_aggr), and a type 462. The type assigned to this particular variable is "aggregate". In the example of FIG. 4C, the finder has been selected from a pull-down menu 464 listing pre-defined finders: "find aggregate". A parameter table 466 for the finder variable is shown in FIG. 4C where each of the parameters of the finder and its associated value are listed.

Although the filters that make up the "find aggregate" finder are not displayed explicitly in FIG. 4C, all of the parameters for the filters that collectively define the "find aggregate" finder are shown in parameter table 466. The values for the parameters can be entered by the architect or designated to be entered as an input value by an operator at run time when executing the workflow. For example, the aggregate location is assigned a value "$Datacenter" that is to be specified by the operator at run time for the workflow, the maximum number of flexible volumes that the aggregate contains is specified to be no more than 300, and the overcommitment threshold of the aggregate is specified to be no greater than 300. These are some example filter criteria that the workflow can use to select an appropriate aggregate in which to place the volume "data_vol" that is created.

In one embodiment, a storage resource filter selection can be applied to cloud deployment of applications by managing multiple storage domains in a customized manner. Customized filters can be specified to define a search algorithm for finding appropriate storage domains. The user can define new filters and finders and change parameters of previously defined filters and/or finders.

Once the four layers of the design tool construct have been accessed as needed by the architect, a workflow engine for the design tool can be directed to enter a planning phase. In the planning phase, each object in the workflow table is converted to a set of parameters. To do this, the workflow engine evaluates each cell in the workflow table by running finders if there are any, to find the appropriate resources, and automatically performing implicit referencing of implicit dependencies between storage objects. The output of the planning phase is an execution plan that is made up of a list of commands with specific parameters for every cell in the workflow table.

After the execution plan for the workflow has been generated, it is ready to be executed. Typically, the execution plan is executed by an operator, and the operator provides run time input values to be used by the workflow. The run time input values to be provided are predetermined by the architect of the workflow, and the values provide the operator the flexibility to adapt the automated workflow process to a particular application. Non-limiting examples of run time input values include a security identifier (SID) or a datacenter in which volumes are to be created. In one embodiment, the architect can design the workflow not to require any input values from the operator.

Figure 5:
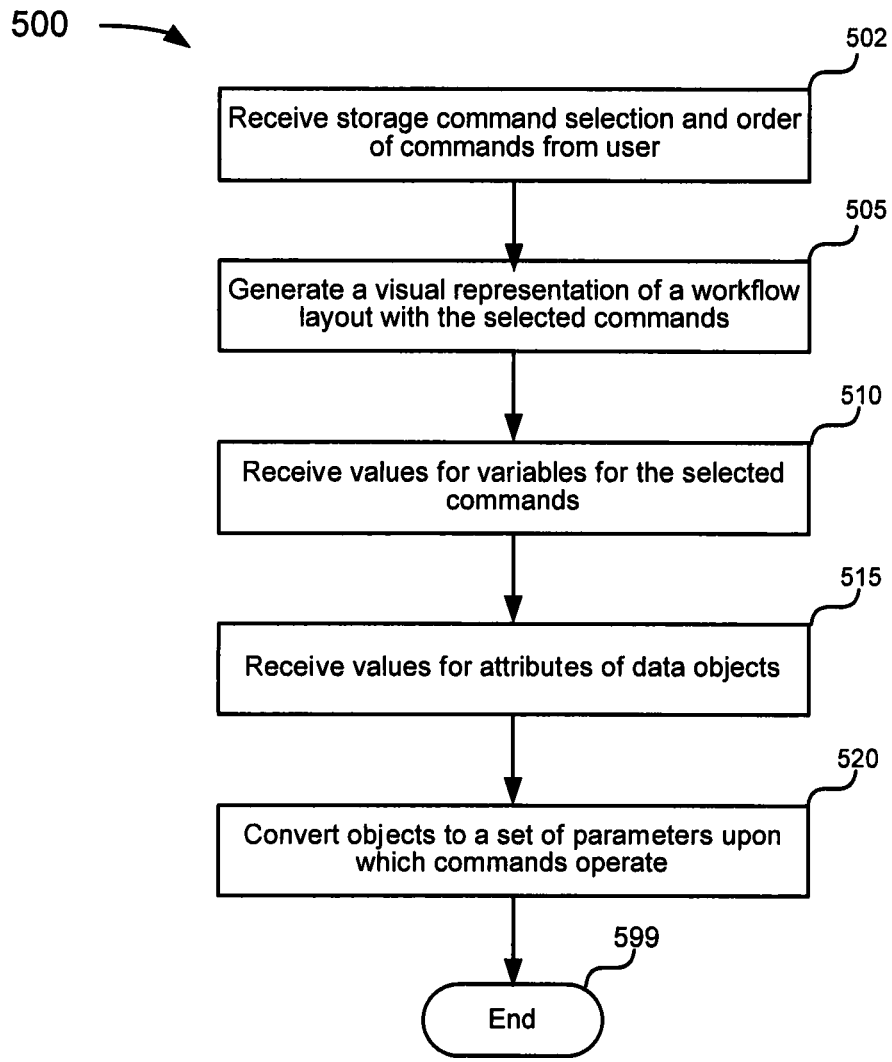
FIG. 5 is a flow diagram illustrating an example process for generating an execution plan for an automated storage process.

FIG. 5 is a flow diagram illustrating an example process 500 for generating an execution plan for an automated storage process. At block 502, the workflow design tool receives a selection of storage commands from the user. The storage commands can be selected from a list of predefined commands. The design tool also receives a sequential ordering of the commands to be performed in the workflow.

At block 505, the workflow design tool 107 generates a visual representation of the workflow layout with the user-selected commands. In one embodiment, the workflow layout is in the format of a table. Next, at block 510, the workflow design tool 107 receives values for the variables for the selected commands. Each selected command can have a number of different variables that may need to be entered by the user to specify a storage object.

At block 515, the workflow design tool 107 receives values for attributes of storage objects defined at block 510. For example, the name of a volume can be entered into a cell as an input value, and attribute values associated with that cell would be attribute related to the specified volume, such as the array in which the volume is located. Then at block 520, the workflow design tool 107 converts the objects in each cell of the workflow table to a set of parameters upon which the corresponding command of the cell's column operates. The process ends at block 599.

While an example of storage provisioning is shown in FIG. 4A, a workflow layout for automating any storage operation or any process can be set up in a similar manner. Further, although the workflow layout was described above with respect to a table-based format, any other type of graphical representation can be used for the workflow layout.

Resource Selection from Generic Data Repositories

As discussed above, a resource selection filter can be created by using the workflow design tool 107, without having to write computer code. It is also possible to allow automated decision-making based not only on information residing on data repositories that are known at the time the workflow is designed, but on data stored on any arbitrary repository. A mechanism through which this can be implemented is a configurable data warehouse that includes a repository and engine for data management and analytics. As shown in the example of FIG. 1, in one embodiment, a data warehouse 120 can be accessed through the network 106 by the workflow design tool 107.

The arbitrary data repositories 130.1-130.2 are coupled to the network 106, as shown in FIG. 1. In one embodiment, the data repositories 130.1-130.2 can include a central repository used by virtualization software, where the central repository includes information on the location of storage resources for a virtual infrastructure. In one embodiment, the data repositories 130.1-130.2 can include a generic data center.

In one embodiment, SQL is used to extract information from storage management stations, virtual centers, and other similar systems.

Figure 6:
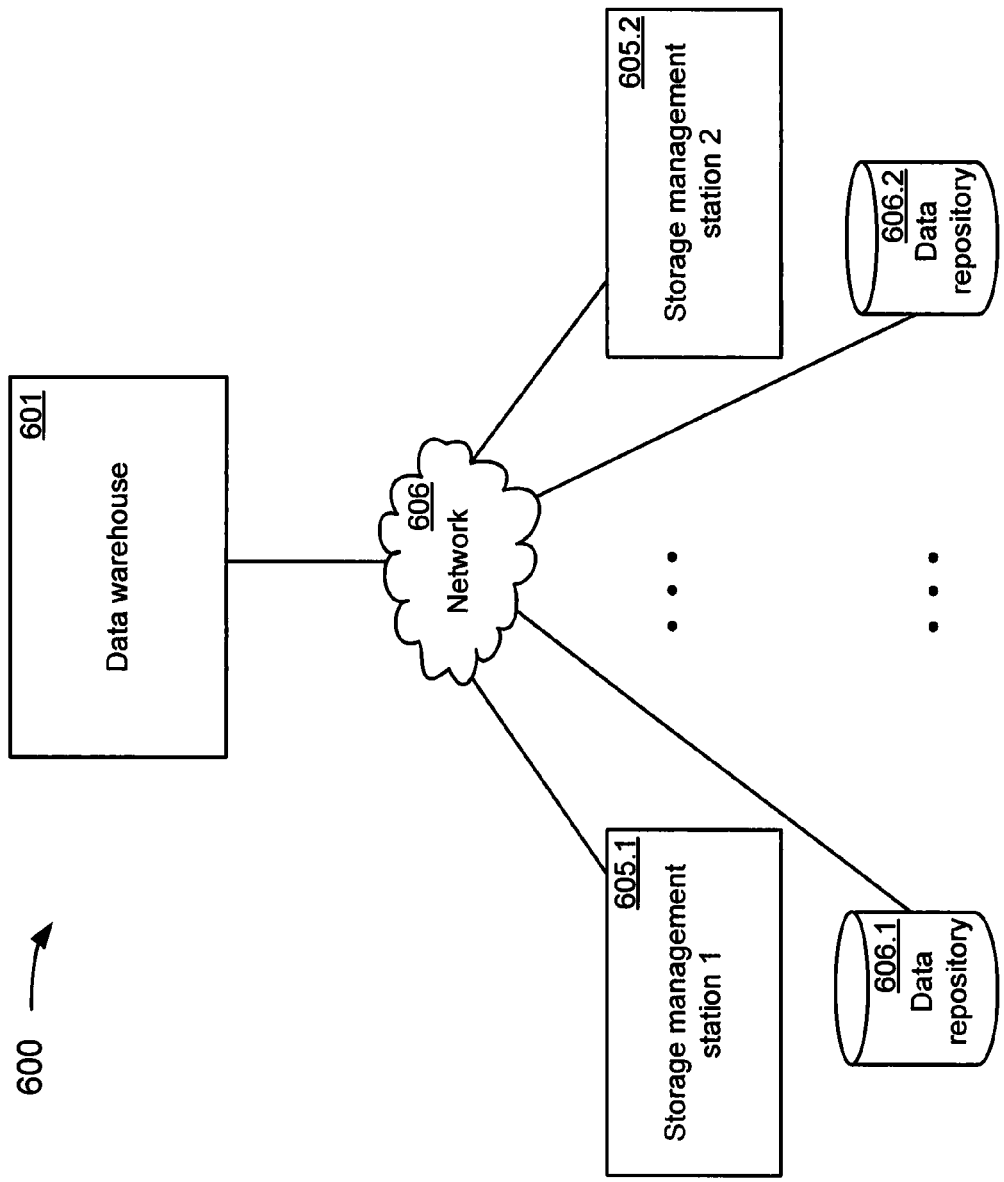
FIG. 6 illustrates an environment in which a configurable data warehouse can be implemented.

In one embodiment, a Simple Object Access Protocol (SOAP)-based application programming interface (API) that uses an extensible markup language (XML) formatted file is used as a means to import configuration setting data from and export configuration setting data to a workflow design tool for automating storage processes. Configuration setting data can include the description of workflows, commands, filters, finders, pre-defined objects such as volumes and qtrees, and functions that can be pre-defined or defined by the architect to perform small repetitive tasks, such as adding values or multiplying values. An XML file can be customized by the architect to communicate with a particular storage management station to perform an extract, transform, and load (ETL) process on a target repository where the data from the target repository is retrieved and placed in the data warehouse. In the example of FIG. 6, the XML file can be customized to retrieve data from data repositories 606.1-606.2 managed by their respective storage management stations 605.1-605.2 over a network 606 and to store the data in a data warehouse 601. In one embodiment, the storage management stations 605.1-605.2 are similar to the management station 109 shown in FIG. 1 and communicate with their respective data repositories.

Once the data has been retrieved and stored in the data warehouse, the filters and finders described above can be applied to the data warehouse to determine appropriate storage resources to be allocated to various steps of the workflow.

Figure 7:
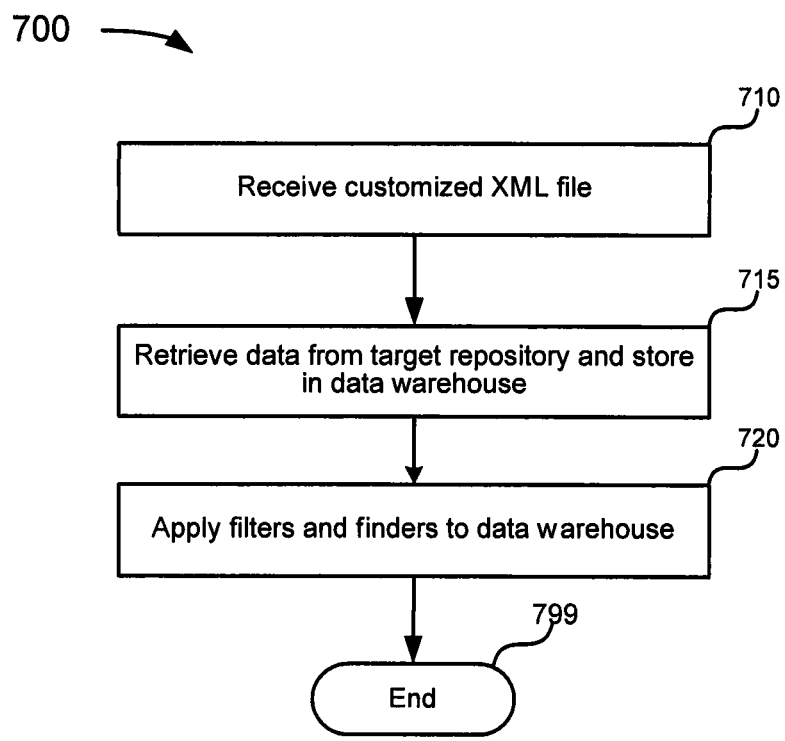
FIG. 7 is a flow diagram illustrating an example process for making decisions based on unknown data repositories.

FIG. 7 is a flow diagram illustrating an example process 700 for making resource selection decisions based on unknown data repositories. At block 710 the data warehouse receives a customized XML file for retrieving data from the management station controlling a target repository. At block 715, the data warehouse retrieves data from the target repository using the XML file through an ETL process.

Then at block 720 the workflow design tool applies filters and finders to the data warehouse to determine the storage resources to be used for various steps in the workflow. The process ends at block 799.

Figure 8:
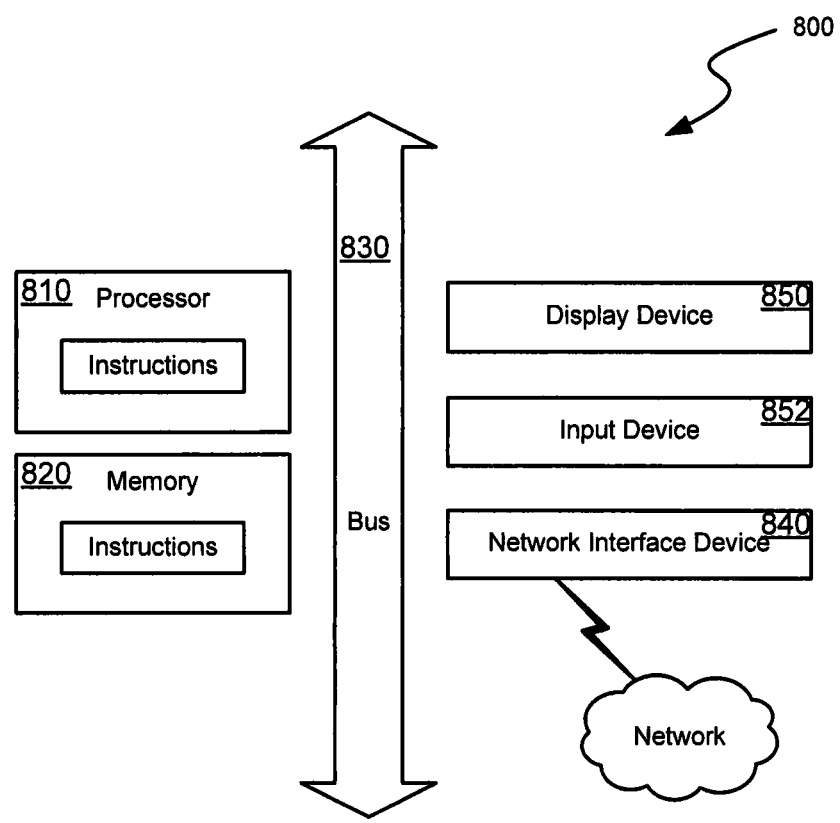
FIG. 8 is a block diagram showing an example of the architecture for a processing system that can be utilized to implement the workflow design tool.

FIG. 8 is a block diagram showing an example of the architecture for a system 800 that can be utilized to implement the techniques described herein. In one embodiment, the system 800 can reside in the management station 109 in FIG. 1 or M-host 218.N in FIG. 2. In FIG. 8, the system 800 includes one or more processors 810 and memory 820 connected via an interconnect 830. The interconnect 830 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 810 can include central processing units (CPUs) that can execute software or firmware stored in memory 820. The processor(s) 810 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 820 represents any form of memory, such as random access memory (RAM), read-only memory (ROM), flash memory, or a combination of such devices. In use, the memory 820 can contain, among other things, a set of machine instructions which, when executed by processor 810, causes the processor 810 to perform operations to implement embodiments of the present invention.

Also connected to the processor(s) 810 through the interconnect 830 is a network interface device 840. The network interface device 840 provides the system 800 with the ability to communicate with remote devices, such as the management station 109, and may be, for example, an Ethernet adapter or Fiber Channel adapter.

The system 800 can also include one or more optional input devices 852 and/or optional display devices 850. Input devices 852 can include a keyboard, a mouse or other pointing device. The display device 850 can include a cathode ray tube (CRT), liquid crystal display (LCD), or some other applicable known or convenient display device.

Figure 9:
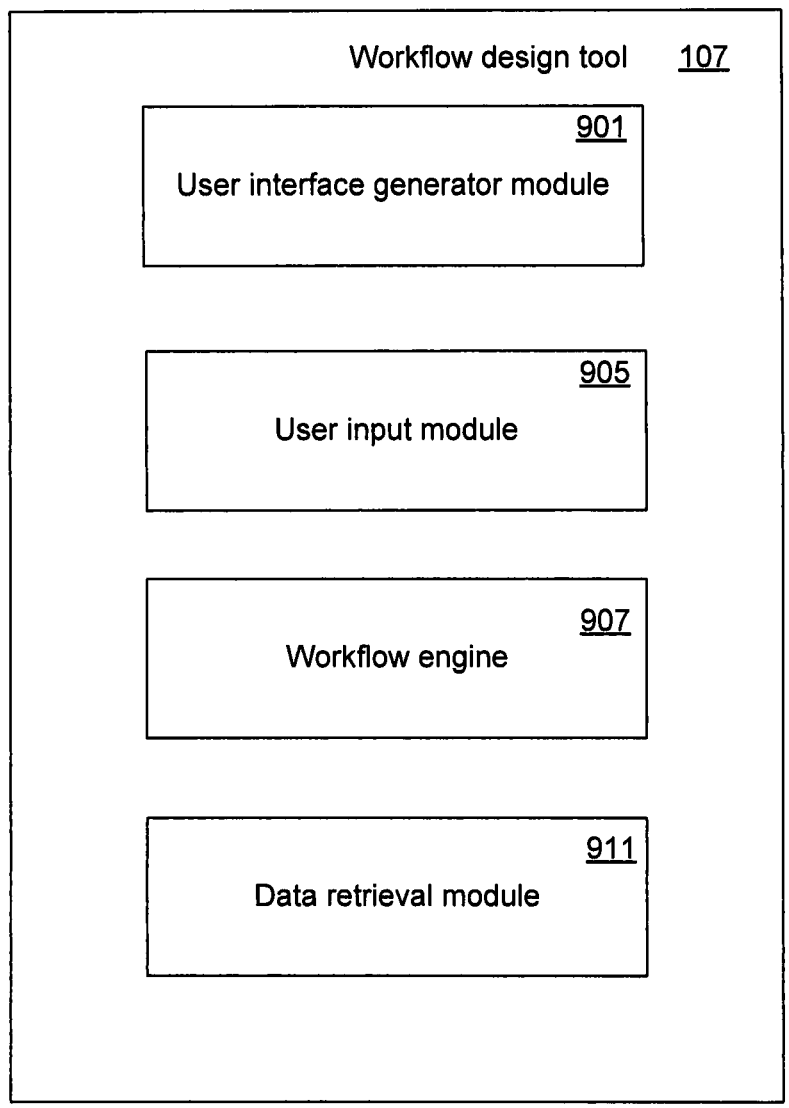
FIG. 9 is an exemplary architecture of a workflow design tool.

FIG. 9 is an example of an architecture of the workflow design tool 107 configured, for example, to generate a user interface that includes a visual representation of a framework for storage-related workflows. In the example of FIG. 9, the workflow design tool 107 (and all of the elements included within the workflow design tool 107) is implemented by using programmable circuitry programmed by software and/or firmware, or by using special-purpose hardwired circuitry, or by using a combination of such embodiments. In some instances, the workflow design tool 107 is implemented as a unit in the processor of the management station 109 in FIG. 1 or M-host 218.N in FIG. 2.

In the example of FIG. 9, the workflow design tool 107 includes a user interface generator module 901, a user input module 905, a workflow engine 907, and a data retrieval module 911. The user interface generator module 901 generates a user interface that includes a visual representation of a framework for a workflow of storage related commands to be performed. The visual representation can be in the form of a table or any other suitable format.

The user input module 905 receives user inputs directed to the visual representation generated by the user interface generator module 901. The user inputs can include a selection of storage related commands, a selection of storage objects, and parameters for the commands and storage objects. The user inputs can also include a selection of filters and parameters for the filters.

The workflow engine 907 converts the objects in the workflow table to a specific set of parameters by running filters and finders to look for appropriate resources and performing automatic referencing of the cells in the table.

The data retrieval module 911 accesses an XML file for performing an extract, transform, and load (ETL) process on a data repository to retrieve data for storage in a configurable data warehouse. The XML file is customized for the particular target data repository.

The techniques introduced above can be implemented by programmable circuitry, e.g., general-purpose microprocessor, programmable microcontroller, etc., programmed or configured by software and/or firmware, or entirely by special-purpose ("hardwired") circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
generating a visual representation of a framework for designing a storage related workflow;
receiving user inputs directed to the visual representation, the user inputs specifying a plurality of storage related commands and a sequence in which the plurality of storage related commands are to be executed, the user inputs further specifying placement, into the visual representation, of identifiers of a plurality of storage objects to be operated upon by the storage related commands;
updating the visual representation to display consecutively within the visual representation the plurality of storage related commands in the specified execution sequence and to display the identifiers within the visual representation at locations associated with a given storage related command to operate on the identifiers upon execution; and
generating a dataset representative of the sequence and the storage objects, based on the user inputs, for subsequent use in executing the workflow.

2. The method of claim 1, further comprising in response to a single command, executing the plurality of storage related commands, based on the dataset, without requiring further user input.

3. The method of claim 1, wherein the user inputs further specify object parameters for each storage object and operation parameters for each storage related command.

4. The method of claim 3, wherein the storage related commands are to be performed on a network storage system, a virtualization system, or a server system, and further wherein the object parameters include a filter for automatically searching for a storage resource on the network storage system, the virtualization system, or the server system.

5. The method of claim 4, further comprising:
accessing an extensible markup language (XML) file customized for retrieving data from a data repository; and using the XML file to perform an extract, transform, and load (ETL) process on the data repository to retrieve data for storage in a configurable data warehouse,
wherein the filter further searches for storage resources in the data warehouse.

6. The method of claim 1, wherein the visual representation is a table.

7. The method of claim 6, wherein the table includes a plurality of rows, and each row represents a separate storage related workflow.

8. The method of claim 7, wherein each row includes a plurality of cells, and wherein each of the identifiers of the plurality of storage objects are entered into one of the plurality of cells.

9. The method of claim 8, wherein the table includes a plurality of columns, and each column is associated with one of the plurality of storage related commands, and the one of the plurality of storage related commands operates on the storage objects identified in the cells in a same column.

10. The method of claim 9, wherein a first storage object identified in a first cell can implicitly reference other storage objects identified in other cells located to the left of the first cell in a same row or to the left of the first cell in a higher row.

11. A method comprising:
receiving storage related commands for a workflow and a sequential order of the commands for execution, wherein the storage related commands operate on a network storage system;
receiving data and parameters for variables of the storage related commands, wherein the data includes storage objects;
receiving filter parameters that define filters for searching for storage resources on the network storage system for the storage related commands;
presenting a visual representation of the workflow that displays consecutively within the visual representation the commands in the sequential order;
generating a dataset representative of the storage related commands, data, parameters, and filters for subsequent use in executing the workflow;
accessing an extensible markup language (XML) file customized for retrieving data from a data repository; and
using the XML file to perform an extract, transform, and load (ETL) process on the data repository to retrieve data for storage in a configurable data warehouse,
wherein the filters further search for storage resources in the data warehouse.

12. The method of claim 11, further comprising in response to a single command, executing the workflow, based on the dataset, without requiring further user input.

13. The method of claim 11, wherein the visual representation is a table.

14. A method comprising:
causing to be displayed by a computing device, via a user interface (UI), a representation of storage workflow information in a data structure array,
wherein each column in the data structure array corresponds to a storage related command; each cell in the data structure array is associated with a cell row and a cell column; a cell content is a identifier of a storage object upon which the storage related command of the cell column is performed; and a workflow sequentially executes storage related commands along the cells in a row;
causing to be displayed by the computing device, via the UI, a selection of storage related commands;
in response to receiving user input, directed to the UI, selecting a plurality of storage related commands and a sequential order for the commands, causing to be displayed, by the computing device via the UI, each selected storage related command in sequential order in the columns of the data structure array;
in response to receiving user input, directed to the UI, a cell content and a cell location in the data structure array, causing to be displayed by the computing device, via the UI, the cell content in the cell location;
receiving command parameters for each storage related command and object parameters for each storage object; and
converting the cells of the data structure array to a list of commands with specific parameters.

15. The method of claim 14, wherein the storage related commands are performed on a network storage system and associated network components.

16. The method of claim 15, further comprising:
causing to be displayed by the computing device, via the UI, a selection of filters, wherein each filter has an adjustable filter search parameter; and
receiving user input, directed to the UI, selecting a filter, wherein applying the filter searches for storage resources in the network storage system.

17. The method of claim 14, further comprising in response to receiving user input, directed to the UI, for moving a row to a specified location in the data structure array, moving the row to the specified location.

18. The method of claim 14, further comprising in response to receiving user input, directed to the UI, for removing a row from the data structure array, removing the row.

19. The method of claim 14, further comprising in response to receiving user input, directed to the UI, for moving a column to a specified location in the data structure array, moving the column to the specified location.

20. The method of claim 14, further comprising in response to receiving user input, directed to the UI, for removing a column from the data structure array, removing the column.

21. The method of claim 14, further comprising:
accessing an extensible markup language (XML) file customized for retrieving data from a data repository; and
using the XML file to perform an extract, transform, and load (ETL) process on the data repository to retrieve data for storage in a configurable data warehouse, wherein the storage related commands are further performed on the data warehouse.

22. The method of claim 21, further comprising:
causing to be displayed by the computing device, via the UI, a selection of filters, wherein each filter has an adjustable filter search parameter; and
receiving user input, directed to the UI, selecting a filter, wherein applying the filter further searches for storage resources in the data warehouse.

23. A computer system comprising:
a processor; and
a computer-readable medium encoded with processing instructions, execution of which by the processor causes the computer system to perform operations including:
generating a visual representation of a framework for designing a storage related workflow;
receiving user inputs directed to the visual representation, the user inputs specifying a plurality of storage related commands and a sequence in which the plurality of storage related commands are to be executed, the user inputs further specifying placement, into the visual representation, of identifiers of a plurality of storage objects to be operated upon by the storage related commands;

updating the visual representation to display consecutively the plurality of storage related commands in the specified execution sequence and to display the identifiers in the visual representation at locations associated with a given storage related command to operate on the identifiers; and generating a dataset representative of the sequence and the storage objects, based on the user inputs, for subsequent use in executing the workflow.

24. The computer system of claim 23, wherein the operations further include in response to a single command, executing the plurality of storage related commands, based on the dataset, without requiring further user input.

25. The computer system of claim 23, wherein the user inputs further specify object parameters for each storage object and command parameters for each storage related command, wherein the object parameters of one storage object are made available to other storage objects, and the command parameters of one storage related command are made available to other storage related commands.

26. The computer system of claim 23, wherein the visual representation is a table.

27. The computer system of claim 26, wherein the table includes a plurality of rows, and each row represents a separate storage related workflow; each row includes a plurality of cells, and wherein each of the identifiers of the storage objects are entered into one of the plurality of cells; and the table includes a plurality of columns, and each column is associated with one of the plurality of storage related commands, and further wherein each cell is associated with the one of the plurality of storage related commands in a same column.

28. A system comprising:
a processor having;
an interface module configured to generate a user interface that includes a visual representation of a framework for a workflow of storage related commands to be performed on a network storage system and other related components, wherein the visual representation includes an array;
a user input module configured to receive user inputs directed to the visual representation, wherein the user inputs include a plurality of storage related commands, a specified order of execution of the commands, and identifiers for a plurality of storage objects to be operated upon by the plurality of storage related commands, wherein columns of the array are arranged to correspond to the plurality of storage related commands in the specified order, and each identifier is placed in a cell of the array in a given column associated with a given storage related command to operate on that identifier upon execution of the workflow;
a workflow engine configured to convert the visual representation to a list of commands with specific parameters to be executed.

29. The system of claim 28, wherein the user inputs further include filters to search for storage resources on the network storage system and other related components.

30. The system of claim 29, wherein converting the visual representation comprises applying the filters to the network storage system and other related components.

31. The system of claim 29, further comprising a data retrieval module configured to retrieve data from a data repository for storage in a data warehouse, wherein the storage related commands are further performed on the data warehouse, and the filters further find storage resources on the data warehouse.

* * * * *

UNITED STATES PATENT AND TRADEMARK OFFICE
CERTIFICATE OF CORRECTION

PATENT NO. : 8,589,336 B1
APPLICATION NO. : 13/093656
DATED : November 19, 2013
INVENTOR(S) : Assaf Levy et al.

Page 1 of 1

It is certified that error appears in the above-identified patent and that said Letters Patent is hereby corrected as shown below:

In the Drawings

On sheet 6 of 11, in Figure 4C, line 3, delete "aggreate" and insert -- aggregate --, therefor.

In the Specification

In column 4, line 17, delete "and or" and insert -- and/or --, therefor.

In column 6, line 18, delete "Qtree"" and insert -- "Qtree" --, therefor.

In column 7, line 51, after "languages" insert -- . --.

Signed and Sealed this
Twenty-second Day of April, 2014

Michelle K. Lee
*Deputy Director of the United States Patent and Trademark Office*